May 21, 1935. V. A. KJÆR 2,002,115
RESILIENT COUPLING
Filed July 10, 1931 2 Sheets-Sheet 2

Patented May 21, 1935

2,002,115

UNITED STATES PATENT OFFICE 2,002,115

RESILIENT COUPLING

Viggo Axel Kjær, Copenhagen, Denmark

Application July 10, 1931, Serial No. 549,996
In Denmark July 26, 1930

10 Claims. (Cl. 64—100)

Figure 1:
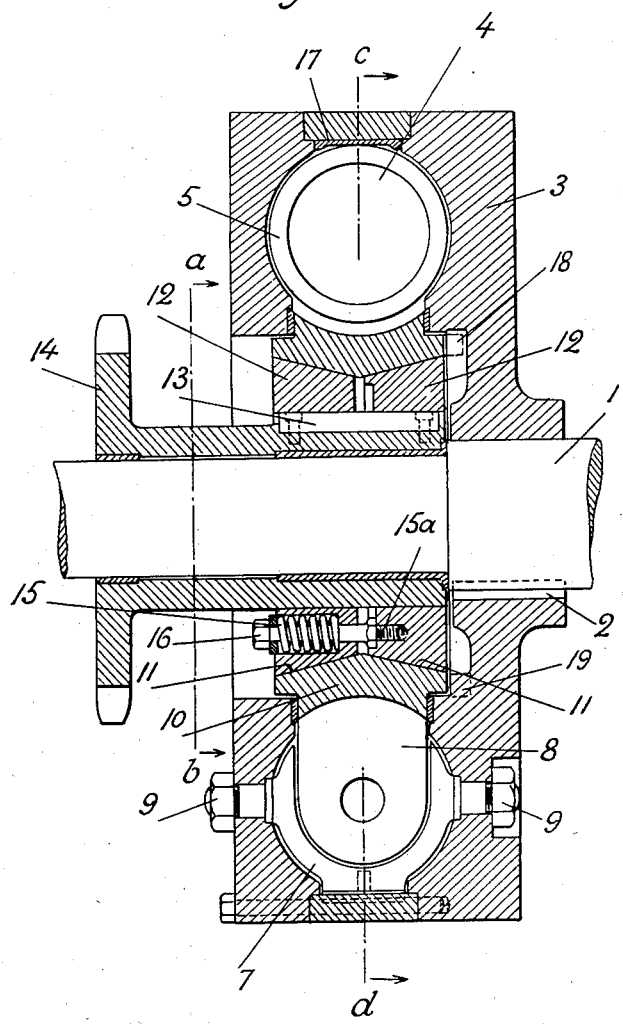
Figure 2:
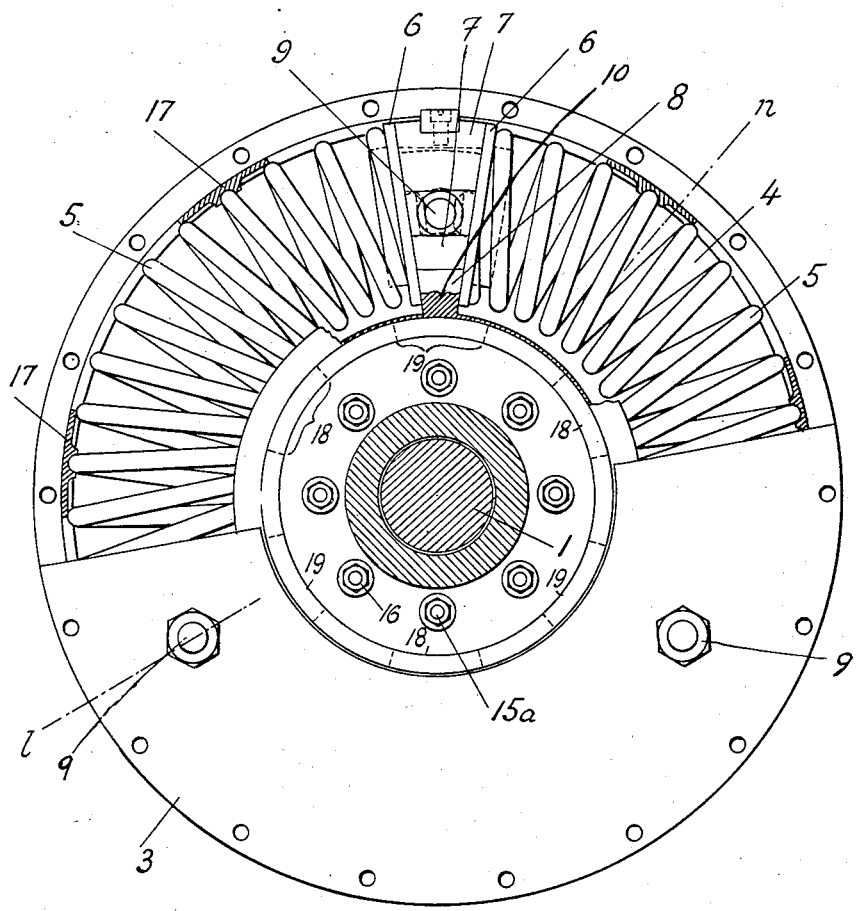

The invention relates to a resilient coupling for the transmission of energy from one shaft to another. Such transmission of energy between two shafts often presents difficulties, when one or both of the shafts rotate with a certain irregularity. This has, namely, often for its result that the mechanical connection between the shaft is exposed to wear or high tensions and that detrimental oscillations occur. In order to overcome these drawbacks resilient couplings have been proposed which served to take up the shocks resulting from the irregularity of the revolutions and to reduce the natural vibration of the whole system of the shafts and the masses rotating therewith, including the coupling elements. In many cases such couplings have, however, proved not to be satisfactory, as it has not been understood to dimension their elements in the correct relation to each other. For instance it has not been possible hitherto to drive a rotating machine from the main shaft of a marine internal combustion engine in a satisfactory manner. The invention has for its object to procure a satisfactory coupling and is founded on the experience that the natural vibration depends only on the values of the transmitted torque, of the total momentum of inertia and of the torsional angle of the coupling. The normal torque transmitted through the coupling is called $Mn$, while the total momentum of inertia of the masses moved through the coupling is $GD^2$. (The driving engine is supposed to have an infinitely great momentum of inertia,) $\theta n$ is the angle which the coupling twists under the influence of the torque $Mn$, and $n^e$ is the period of natural vibration of the machine driven through the coupling, namely of vibrations having their nodal point in the coupling element connected with the driving engine. The period of natural vibration $n^e$ depends on the three values $Mn$, $GD^2$ and $\theta n$ in that way that $$n^{e2} = \frac{a.Mn}{\theta n.GD^2},$$

where $a$ is a constant. As the torque is given, you must, in order to reduce the number of vibrations, either make $GD^2$ or $\theta n$ large. It appears now that an enlargement of the momentum of inertia presents many difficulties, particularly by rapidly running machines, whereas an enlargement of the torsional angle of the coupling presents possibilities of obtaining good results. In the hitherto known resilient couplings the torsional angle is only small, but according to the invention a coupling is employed, the normal torsional angle of which is far greater than by the hitherto used couplings. The normal torsional angle is, however, not the greatest angle, which the coupling is able to twist, as for practical regards the coupling must be so constructed that its maximum torsional angle is almost twice the normal torsional angle. According to the invention the coupling is so constructed that it is able to twist at least 10° out from the normal position (position of rest). The invention conditions quite a new and particular construction, because the greater torsional angle necessitates the employment of long weak springs. For the sake of room these are preferably arranged in a frame occupying the whole periphery of the coupling. The invention is further characterized by particular means for the fixing and guiding of the springs, as the thrust members of the springs have to occupy the smallest possible space in peripheral direction. Finally, stops must be provided for in combination with a frictional coupling, as the soft springs cannot stand the great torque that may occur when starting. The invention is illustrated in the accompanying drawings, whereon Fig. 1 is a longitudinal section through a constructional form of the invention, in which the upper half of the view is a section on the line $n$ of Fig. 2 and the lower half is a section on the line $l$ of Fig. 2. Fig. 2 is a transverse section, the upper part being on the line $c$—$d$ and the lower part on the line $a$—$b$ of Fig. 1. In the constructional form shown, a casing 3 for the coupling is fitted on a shaft 1 by means of a key 2. The interior of the casing 3 forms an annular space 4 of substantially circular cross section.

This space receives three coil springs 5 (of which only parts of the two are visible in Fig. 2). The ends of these springs 5 press against spring pads 6, which in turn press against two wedge-shaped thrust members 7 and 8 respectively, so that each spring with one end presses against a thrust member 7, and with its other end against a thrust member 8. In Fig. 2 only a small part of the thrust member is seen, the remaining part being covered by the thrust member 7. Each of the thrust members 7 are substantially U-shaped (see Fig. 1) and fastened to the casing 3 so that the gap faces inwardly against the axis of the coupling, whilst each of the members 8 are shaped so as to fit with a small play in the gap of the member 7, so as it clearly appears from the lower part of Fig. 1. The springs 5 are provided with supporting shoes 17 engaging the spring coils and slidable along the inwardly facing surface of the annular space 4 of the casing 3, so that they serve to guide the coils of the spring within the circular annular space 4. The thrust member 7 is connected by bolts and nuts 9 with the casing 3, and the thrust member 8 is rigidly connected or in one piece with an annular clutch part 10, being provided with a suitable number of projections 18, f. inst. three, corresponding to similar projections 19 on the casing 3. The clutch part 10 besides has two conical clutch faces 11 which coact with corresponding clutch faces on two clutch elements 12 which are rigidly attached by means of a key 13 to a chain wheel 14 rotatable on the shaft 1. The two clutch elements 12 are held together by means of a number of bolts 15a having nuts 16 and are pressed against the clutch faces 11 by providing springs 15 between the nuts 16 and the clutch element 12 which is slidable on the bolt 15a. The compression of the springs can be adjusted by adjusting the nut 16. During rotation of the shaft 1 pressure is transmitted through the casing 3 and the wedge-shaped thrust member 7 to the spring 5 and in consequence of their compression a displacement occurs between the thrust member 7 and the thrust member 8, the former overriding the latter. This causes each of the spring guides 6 at the ends of the springs 5 to bear against only one of the thrust members 7 and 8, so that the pressure is transmitted by each spring from one thrust member 7 to one thrust member 8. As the separation between the thrust members may take place either way, the coupling is effective in either direction of rotation of the shaft. According to the invention the springs 5 are very weak, so that they allow the coupling to twist a great angle, whereby it is obtained that the rotating system, including the coupling get a natural vibration frequency which even by speeds much lower than the usual speed does not harmonize with the vibration creating impulses. The coacting projections 18 and 19 serve to keep the mutual angular movement of the clutch member 10 and the casing 3 and thus the stress of the springs 5 within reasonable limits. The coacting clutch members 10 and 12 are so pressed together that during ordinary operation no slip occurs. Slip only takes place if, during starting or stopping of the engine, while passing through speeds where resonance occurs, torsional vibrations are set up which set up greater strains than that for which the friction coupling is set. In the event of such slip between the faces 11 on the clutch member 10 and the corresponding faces on the clutch member 12, a certain amount of the vibrational work is absorbed and the detrimental effect of the orsional vibrations is thus eliminated. The invention is not restricted to the particular construction described and illustrated which is given only as example of a preferable manner of carrying out the invention.

I claim:

1. In a resilient coupling for connecting two shafts, a casing 3 keyed to one shaft 1, coacting thrust members 7 and 8, said casing 3 having attached thereto a part 7 of said thrust members, a coil spring 5 in the casing with one end acting against said part 7 of the thrust members and with its other end against the other part 8 of the thrust members, said other part 8 being attached to a clutch part 10 having conical clutch surfaces 11 coacting with corresponding surfaces on another clutch part 12 connected to the second shaft, said two coupling parts 10 and 12 constituting together a frictional coupling.

2. A coupling as claimed in claim 1, in which two coacting parts 7 and 8 of the thrust members are interfitted one with the other to prevent axial movement of the thrust members relative to each other but permitting circumferential movement relatively to each other.

3. A coupling as claimed in claim 1, in which the casing 3 is provided with shoes 17 engaging the spring coils, said shoes being slidable along the surface of the interior of the casing facing inwardly against the spring.

4. A resilient coupling for connecting two shafts comprising a casing 3, coacting thrust members 7 and 8, one part 7 of the thrust members being attached to said casing, a spiral spring carried by the casing and operative against said thrust members, the other part 8 of which is rigidly connected to a coupling part 10 constituting the one part of a frictional coupling, the other part 12 of which is keyed to the second shaft, and means 16 for increasing or decreasing the friction between the said parts 10 and 12 of the frictional coupling.

5. A coupling as claimed in claim 4, in which the one part 7 of the thrust members being attached to the casing 3 is substantially U-shaped, having its gap facing inwardly against the axis of the coupling, while the other part 8 of the thrust members connected to the coupling part 10 is shaped so as to fit with a small play in the said gap of the part 7 of the thrust members.

6. A coupling as claimed in claim 1, in which the spring coupling surrounds the frictional coupling, the spring coupling being arranged on the periphery of the coupling unit.

7. A resilient coupling for transferring energy from a driving shaft to a driven shaft comprising a casing keyed to the driving shaft, a series of thrust members fixedly secured in the walls of said casing, a double coned annulus within the casing keyed to the driven shaft and a second oppositely double coned annulus surrounding and frictionally connected to the first named annulus, a series of thrust members rigid with and extending outwardly from the second named annulus, and springs bearing the one end on one of the thrust members secured to the casing and the other end on one of the thrust members secured to the second named annulus whereby the strength of the springs becomes a regulable factor in determining the angle of torsion.

8. The device as claimed in claim 7 in which the thrust members fixed to the casing are U-shaped and the thrust members rigid with the second named double coned annulus extend into the U.

9. The device as claimed in claim 7 wherein the casing is provided with an annular recess, stops in said recess rigid with the casing, and corresponding stops rigid with the second named annulus and extending into said recess, between the stops rigid with the casing whereby the angle of torsion may not exceed a predetermined limit.

10. The device as claimed in claim 7 in which means are provided to vary the pressure between the two double coned annuli whereby the maximum stress on the spring may be predetermined.

VIGGO A. KJÆR.